(12) United States Patent
Russell et al.

(10) Patent No.: US 6,853,786 B2
(45) Date of Patent: Feb. 8, 2005

(54) PHOTONIC-CRYSTAL FIBERS AND PHOTONIC-CRYSTAL FIBER DEVICES

(75) Inventors: Phillip St. John Russell, Bath (GB); Timothy Adam Birks, Bath (GB); Jonathan Cave Knight, Bath (GB); Brian Joseph Mangan, Bath (GB)

(73) Assignee: Crystal Fibre A/C, Birkerød (DK)

( * ) Notice: Subject to any disclaimer, the term of this patent is extended or adjusted under 35 U.S.C. 154(b) by 80 days.

(21) Appl. No.: 10/149,556

(22) PCT Filed: Dec. 7, 2000

(86) PCT No.: PCT/GB00/04710
§ 371 (c)(1),
(2), (4) Date: Oct. 1, 2002

(87) PCT Pub. No.: WO01/42831
PCT Pub. Date: Jun. 14, 2001

(65) Prior Publication Data
US 2003/0077058 A1 Apr. 24, 2003

(30) Foreign Application Priority Data
Dec. 10, 1999 (GB) .............................................. 9929345

(51) Int. Cl.[7] ................................................. G02B 6/02
(52) U.S. Cl. ........................ 385/125; 385/123; 385/124; 385/126
(58) Field of Search ................................ 385/123–128; 372/6; 65/390, 391, 399, 403, 412

(56) References Cited

U.S. PATENT DOCUMENTS

| | | | |
|---|---|---|---|
| 5,155,792 A | | 10/1992 | Vali et al. |
| 5,802,236 A | | 9/1998 | DiGiovanni et al. |
| 6,097,870 A | * | 8/2000 | Ranka et al. ............... 385/127 |
| 6,243,522 B1 | * | 6/2001 | Allan et al. ................. 385/123 |
| 6,334,017 B1 | * | 12/2001 | West .......................... 385/123 |
| 6,404,966 B1 | * | 6/2002 | Kawanishi et al. ......... 385/125 |

FOREIGN PATENT DOCUMENTS

| | | | |
|---|---|---|---|
| DE | 196 34 893 A1 | 5/1997 | |
| EP | 0 859 247 A | 8/1998 | |
| EP | 0 905 834 A2 | 3/1999 | |
| EP | 1 128 194 A2 | 8/2001 | |
| GB | 2 338 799 A | 12/1999 | |
| GB | 235090 A | * 12/2000 | ............ G02B/6/20 |
| WO | WO 99/00685 A1 | 1/1999 | |
| WO | WO 00/49436 A1 | 8/2000 | |
| WO | WO 200060388 A1 | * 10/2000 | |
| WO | WO 00/72067 A1 | 11/2000 | |

OTHER PUBLICATIONS

Cregan R. F. et la., "Single–Mode Photonic Band Gap Guidance of Light in Air," *Science US, AAAS*, 285(5433), pp. 1537–1539 (1999).

(List continued on next page.)

Primary Examiner—Michael G. Lee
Assistant Examiner—Uyen-Chau N. Le
(74) Attorney, Agent, or Firm—Fogg and Associates, LLC; Laura A. Ryan (57) ABSTRACT

A photonic crystal fiber comprising: a core (20) having a refractive index; and a cladding region (10) at least substantially surrounding the core (20) and comprising a bulk material having a second refractive index that is higher that the first refractive index, the bulk material containing an arrangement of elongate, longitudinal holes that comprise hole material of a third refractive index that is lower than the first refractive index; such that an electromagnetic mode guided in the core (20) has an evanescent wave that becomes more closely confined to the vicinity of the core (20) as the wavelength of the electromagnetic mode is increased over a first range of wavelengths.

68 Claims, 3 Drawing Sheets

OTHER PUBLICATIONS

Knight, J.C. et al., "Pure Silica Single–Mode Fibre with Hexagonal Phototonic Crystal Cladding," *OFC '96 Post Deadline Paper, PD3*, pp. 1–5 (Feb. 29, 1996).

Knight, J.C. et al., "All–Silica Single–Mode Optical Fiber with Photonic Crystal Cladding," *Optics Letters, 21*(19), pp. 1547–1549 (Oct. 1, 1996).

Knight, J.C. et al., "Multicore Phototonic Crystal Fibres," *12th International Conference on Optical Fibre Sensors, Technical Digest*, pp. 670–673 (Oct. 1997).

Knight, J.C. et al., "Large Mode Area Phototonic Crystal Fibre," *Electronic Letters, 34*(13), pp. 1347–1348 (Jun. 25, 1998).

Knight, J.C. et al., "Phototnic Band Gap Guidance in Optical Fibres," *Science, 282*, pp. 1476–1478 (Nov. 20, 1998).

Monro, T.M. et al., "Developing Holey Fibres for Evanescent Field Devices," *Electronic Letters, 35*(14), pp. 1188–1189 (Jul. 8, 1999).

*New Scientist*, pp. 36–39 (Jun. 12, 1999).

\* cited by examiner

PHOTONIC-CRYSTAL FIBERS AND PHOTONIC-CRYSTAL FIBER DEVICES

BACKGROUND OF THE INVENTION

1. Field of the Invention

This invention relates to the field of photonic-crystal fibres and photonic-crystal fibre devices.

2. Description of the Related Art

Single-mode optical fibres are widely used in diverse applications in fields including telecommunications and sensing. A typical optical fibre of the prior art (referred to hereunder as a "standard fibre") is made entirely from solid transparent materials, such as glass. The transparent material in one part (usually the middle) of a cross-section through the fibre has a higher refractive index than transparent material in the rest of the cross-section (the "cladding") and forms an optical "core" within which light is guided by total internal reflection.

Although light guided by total internal reflection in a fibre propagates predominantly in the high-index core, some light extends into the surrounding, lower-index cladding. That light is called the "evanescent wave"; its intensity decreases quasi-exponentially with distance from the core and is usually negligible towards the periphery of the fibre. A number of technologically important devices exploit interactions with this evanescent wave. For example, a fibre can be made that contains two cores that are close enough to each other for their evanescent waves to overlap; that allows light to couple from one core to the other, so that the fibre acts as a directional coupler. In another example of a device, one polarisation of the evanescent wave interacts preferentially with a nearby plane metal surface, so that a fibre polariser is formed.

Although special fibres like two-core fibres and D-fibres can be designed so that the evanescent wave is accessible, in standard fibres the evanescent wave at the outer surface is negligible; that is desirable in order to minimise loss and sensitivity to the environment. Local access to the evanescent wave can be obtained in such a fibre by the abrasive removal of cladding material. Typically, in such a process, the fibre is embedded in a glass block and polished so that a flat surface is produced. Polishing continues until the flat surface reaches close enough to the fibre's core for the evanescent wave at the surface to be significant. Placing the flat surfaces of two such fibres in contact can then produce a directional coupler.

In standard fibres, the evanescent wave generally extends less far into the cladding for short wavelengths than it does for longer wavelengths. The light is thus more tightly confined to the core and any evanescent interaction is weaker. Although the rate of change of the strength of the interaction with wavelength can often be varied, through control of the core size and difference in refractive index between the core and the cladding, the trend in behaviour is usually the same. Thus, if the strength of interaction in an evanescent-wave device is optimal at one wavelength, it will be too strong at longer wavelengths (perhaps causing loss) and too weak at shorter wavelengths. For example, an evanescent wave directional coupler will only yield a given beam-splitting ratio at one wavelength (or a set of isolated wavelengths). However, it is often desirable for the functional properties of an optical device to be substantially independent of wavelength.

In some spectral filtering applications, a substantial evanescent interaction is required over one wavelength range of interest but not over another. In a device based on a standard fibre, it will be the longer wavelength range for which there is a stronger evanescent interaction. However, it may sometimes be desirable for the stronger evanescent interaction to occur for the shorter wavelength range.

The extent to which light is confined to the core of a fibre is related to the fibre's so-called "V-value", defined as $$V = \frac{2\pi\rho}{\lambda}\sqrt{n_{co}^2 - n_{cl}^2}, \quad (1)$$

where $\rho$ is the core radius, $\lambda$ is the wavelength, and $n_{co}$ and $n_{cl}$ are the refractive indices of the core and cladding material respectively. As V increases, the evanescent wave is more tightly confined to the vicinity of the core.

An entirely new type of optical fibre has been developed recently, called the photonic-crystal fibre (PCF). A conventional PCF is made from a single transparent material such as fused silica glass. The material incorporates a regular array of air-filled holes that run along the length of the fibre, at least one of which holes is missing (see, for example, J. C. Knight et al., Optics Letters 21 (1996) 1547.). The site of a missing hole is a region of locally raised refractive index and such a region can act as a waveguiding fibre core.

Light is guided in the core by a form of total internal reflection. The fibre's cladding, incorporating low-index air holes as well as high-index glass, has a lower effective refractive index than the core, which is high-index glass only. Calculations of the effective cladding index show that the shorter the wavelength of light propagating in the fibre, the higher is the effective cladding index, and in the limit of short wavelengths, the effective cladding index approaches the index of the glass (T. A. Birks et al., Optics Letters 22 (1997) 961); that is because, at shorter wavelengths, the optical field in the cladding becomes more concentrated in the glass and avoids the holes, thus raising the effective refractive index of the cladding. However, the core index is always greater, so the core will guide light.

The refractive indices and the core radius of a standard fibre are approximately independent of wavelength and so V is inversely proportional to wavelength, resulting in the trend in behaviour described above. In a conventional PCF, the effective cladding index plays the role of $n_{cl}$ in equation (1); V is again an increasing function of inverse wavelength, so the evanescent wave behaves similarly to an evanescent wave in a standard fibre: it becomes more tightly confined to the vicinity of the core at lower wavelengths, thus decreasing the strength of any evanescent interaction.

SUMMARY OF THE INVENTION

According to the invention there is provided a photonic-crystal fibre comprising: a core having a first refractive index; and a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index; such that an electromagnetic mode guided in the core has an evanescent wave that becomes more closely confined to the vicinity of the core as the wavelength of the electromagnetic mode is increased over a first range of wavelengths.

The hole material may be a solid, a liquid or a gas or it may be a vacuum.

Such a fibre may be, for example, an otherwise conventional photonic-crystal fibre, in which the glass in the core region has a refractive index that is lower than that of the glass in the cladding. As before, the effective cladding index approaches the index of the glass in the cladding at short wavelengths. However, in the fibre of the invention the core index is less than the index of the cladding glass. Therefore, as wavelength is reduced, a cut-off wavelength $\lambda_c$ can be reached where the effective cladding index exceeds the core index, and the fibre core can no longer guide light by total internal reflection. As the wavelength decreases from above to approach $\lambda_c$, waveguiding becomes less strong and the evanescent wave starts to become less confined to the vicinity of the core, unlike in a standard fibre or a conventional PCF. At long wavelengths, the evanescent field behaves normally. At wavelength $\lambda_m$, V is a maximum; the extent of the evanescent wave is a minimum and is therefore insensitive to small changes of wavelength. At shorter wavelengths, the wavelength dependence of the evanescent wave becomes anomalous as described above, until at $\lambda_c$ V becomes zero and the mode ceases to be guided at all.

The effects of variations of the refractive index of the materials with wavelength are generally insignificant compared with the variation of the effective refractive index of the cladding with wavelength. Although the wavelength dependence of the material refractive index may be quite strong, the difference between the core glass refractive index and the cladding glass refractive index will, in general, not vary significantly with wavelength. The invention does not rely upon a particular combination of core glass and cladding glass in which each glass is carefully selected for particular characteristics of the variations of its refractive index with wavelength. Rather, the invention may be embodied in fibres made from any of a wide range of glasses, provided that the core glass has a refractive index between that of the material filling the holes and that of the cladding glass.

There may be microstructure, such as elongate, longitudinal holes, similar to those in the cladding, in the core: in that case, the average refractive index (for example, the root-mean-square average refractive index) of the core (usually the unit cell or cells containing a defect) will be larger than the third refractive index (that of the hole material) and smaller than the second refractive index (that of the bulk cladding material). For example, the core may include a hole that has a larger cross-section than corresponding holes in the cladding region.

Preferably the difference between the first refractive index and the second refractive index is greater than or equal to $0.5 \times 10^{-3}$. A greater refractive index difference may produce enhanced effects, and so more preferable differences would be greater than or equal to $1 \times 10^{-3}$, $1.2 \times 10^{-3}$, $2 \times 10^{-3}$, $5 \times 10^{-3}$, $10 \times 10^{-3}$, or $20 \times 10^{-3}$.

Preferably, the fibre has a cut-off wavelength below which the electromagnetic mode is not guided.

Preferably, the evanescent wave becomes less closely confined to the vicinity of the core as the wavelength of the electromagnetic mode is increased over a second range of wavelengths that are higher than the wavelengths in the first range. Preferably, the confinement of the evanescent wave to the vicinity of the core is substantially insensitive to wavelength over a third range of wavelengths. Wavelengths in the third range will generally be higher than the wavelengths in the first range and lower than the wavelengths in the second range.

The evanescent wave may interact with another entity over at least some wavelengths. The strength of an evanescent interaction will depend on the extent of the evanescent wave. Although this interaction strength depends on other factors as well, some of which may also have their own wavelength dependence, the interaction strength will follow the same trends in behaviour as the extent of the evanescent wave. Thus the behaviour of evanescent wave devices based on the fibre may be substantially independent of wavelength over a certain wavelength range or the interaction may be stronger at shorter wavelengths than at longer wavelengths.

The interaction may be greater over a range of shorter wavelengths than over a range of longer wavelengths. The interaction may be significant over a range of shorter wavelengths but insignificant over a range of longer wavelengths.

Access to the evanescent wave from the external environment may be achieved by post-processing a fibre that otherwise would have a negligible evanescent interaction with the external environment. Thus, post-processing of the fibre may have facilitated the interaction. Preferably, the post-processing included the abrasive removal of material from the fibre; for example, by polishing. Alternatively, the post-processing included the chemical removal of material from the fibre; for example, by etching or local partial or complete collapse of the holes in the cladding region by heating. The interaction may be facilitated by the core being sufficiently close to the periphery of the fibre for a significant part of the evanescent wave to reach the surface of the fibre; for example, the fibre may have a substantially D-shaped cross-section and the core may be close to the linear edge of that cross-section.

A variety of optical devices may incorporate fibres according to the invention. If the light can interact with a particular property in the environment (for example, the external refractive index), the fibre may act as an environmental sensor. If a suitable optical element is placed near or in contact with the fibre, optical devices may be built based on the interaction with that element. Thus, the interacting entity may be the environment external to the fibre. The interacting entity may be an external measurand. Alternatively, the interacting entity may be an optical element external to the fibre.

Preferably, the optical element is an optical fibre. More preferably, the optical fibre lies adjacent to and parallel to the first fibre. The optical fibre may be a photonic-crystal fibre according to the invention. Alternatively, the optical fibre may be a standard fibre. The fibres may have been at least partially fused together; for example, by a process used to fabricate fused couplers in standard fibres. The optical device may be a directional coupler, preferably a substantially wavelength insensitive directional coupler.

The optical element may be a metallic layer; in which case, the optical device may be, for example, an optical fibre polariser.

The optical element may be a dielectric overlay; in which case the optical device may be, for example, a spectral filter. If the overlay is an active optical material, the optical device may be, for example, an optical switch or modulator.

The interacting entity may be a structure within the fibre; for example, one or more further cores in the optical fibre, a diffraction grating, or a doped material (which may be pumped to provide gain). The optical device may then be, for example, a spectral filter, an optical sensor, a laser or an optical amplifier. A fibre with two cores may be used to form an optical device that is a directional coupler (preferably a substantially wavelength-insensitive directional coupler).

The usefulness of the fibre is not limited to devices based on evanescent wave interactions. For example, a spectral filter may comprise a photonic-crystal fibre according to the invention, in which propagation of light at a short wavelength is suppressed while propagation of light at a long wavelength is supported.

The transmission loss due to bending of the fibre may vary with wavelength in a non-standard way. For example, the sensitivity of the fibre to bending may be substantially independent of wavelength over a range of wavelengths or the sensitivity of the fibre to bending may be significantly less at longer wavelengths than at shorter wavelengths. That is not, in general, possible in standard fibres. Thus, a bend sensor could comprise an optical fibre according to the invention.

It is also possible to arrange for the guided mode's field distributions to be substantially similar at two well-separated wavelengths; for example, wavelengths at which the V-values are equal. In a laser comprising such a fibre, the two wavelengths may be a pump wavelength and a laser wavelength and, in an amplifier comprising such a fibre, the two wavelengths may be a pump wavelength and an amplified wavelength. A fibre laser or optical amplifier made from such a fibre would be expected to be very efficient, because the overlap of the modes at the pump and laser or signal wavelengths would be good.

Also according to the invention, there is provided a method of manufacturing a photonic-crystal fibre, the method comprising the following steps: (a) forming a stack of canes, the stack including (i) canes arranged to form a core having a first refractive index and (ii) canes, at least some of which are capillaries, arranged to form a cladding region, at least substantially surrounding the core, and comprising a bulk material having a second refractive index that is higher than the first refractive index, the capillaries having elongate, longitudinal holes that comprise hole material of a third refractive index that is lower than the first refractive index; (b) drawing the stack of canes into a fibre; such that an electromagnetic mode guided in the core of the fibre has an evanescent wave that becomes more closely confined to the vicinity of the core as the wavelength of the electromagnetic mode is increased over a first range of wavelengths.

Preferably, the canes arranged to form the core include at least some canes which are capillaries. Preferably, the hole material is air. Preferably, the photonic-crystal fibre is a photonic-crystal fibre as described above.

Also according to the invention there is provided a method of guiding an electromagnetic mode in a photonic crystal fibre comprising:
  (i) a core having a first refractive index; and
  (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
the method including the step of increasing the wavelength of the electromagnetic mode from a first wavelength to a second wavelength so that an evanescent wave of the mode becomes more closely confined to the vicinity of the core.

Preferably, the mode passes from a state in which it is not guided by the core to a state in which it is guided by the core, as the wavelength is increased.

Also according to the invention there is provided use of a photonic crystal fibre comprising:
  (i) a core having a first refractive index; and
  (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
to enable the evanescent wave of an electromagnetic mode guided in the core to become less closely confined to the vicinity of the core as the wavelength of the electromagnetic mode is decreased from a first wavelength to a second wavelength.

Preferably, the mode passes from a state in which it is not guided by the core to a state in which it is guided by the core, as the wavelength is decreased.

Also according to the invention there is provided a method of less closely confining the evanescent wave of an electromagnetic mode guided in a photonic crystal fibre comprising:
  (i) a core having a first refractive index; and
  (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
wherein the evanescent wave is less closely confined to the vicinity of the core by decreasing the wavelength of the electromagnetic mode from a first wavelength to a second wavelength.

Also according to the invention there is provided an optical-fibre device comprising:
  (i) a core having a first refractive index; and
  (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
  (iii) light, having a maximum intensity within the core, but not guided by the core;
wherein, the light would become guided in the core if the wavelength of the light were to be increased beyond a wavelength $\lambda_c$ at which the effective refractive index of the cladding equals the refractive index of the core. The device may be, for example, a spectral filter, a sensor or a coupler.

Also according to the invention there is provided an evanescent-wave device, comprising:
  (i) a core having a first refractive index; and
  (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
such that an electromagnetic mode guided in the core has an evanescent wave that becomes more closely confined to the vicinity of the core as the wavelength of the electromagnetic mode is increased over a first range of wavelengths.

BRIEF DESCRIPTION OF THE DRAWINGS

An embodiment of the invention will now be described, by way of example only, with reference to the accompanying drawings, of which.

DESCRIPTION OF THE PREFERRED EMBODIMENTS

Figure 1:
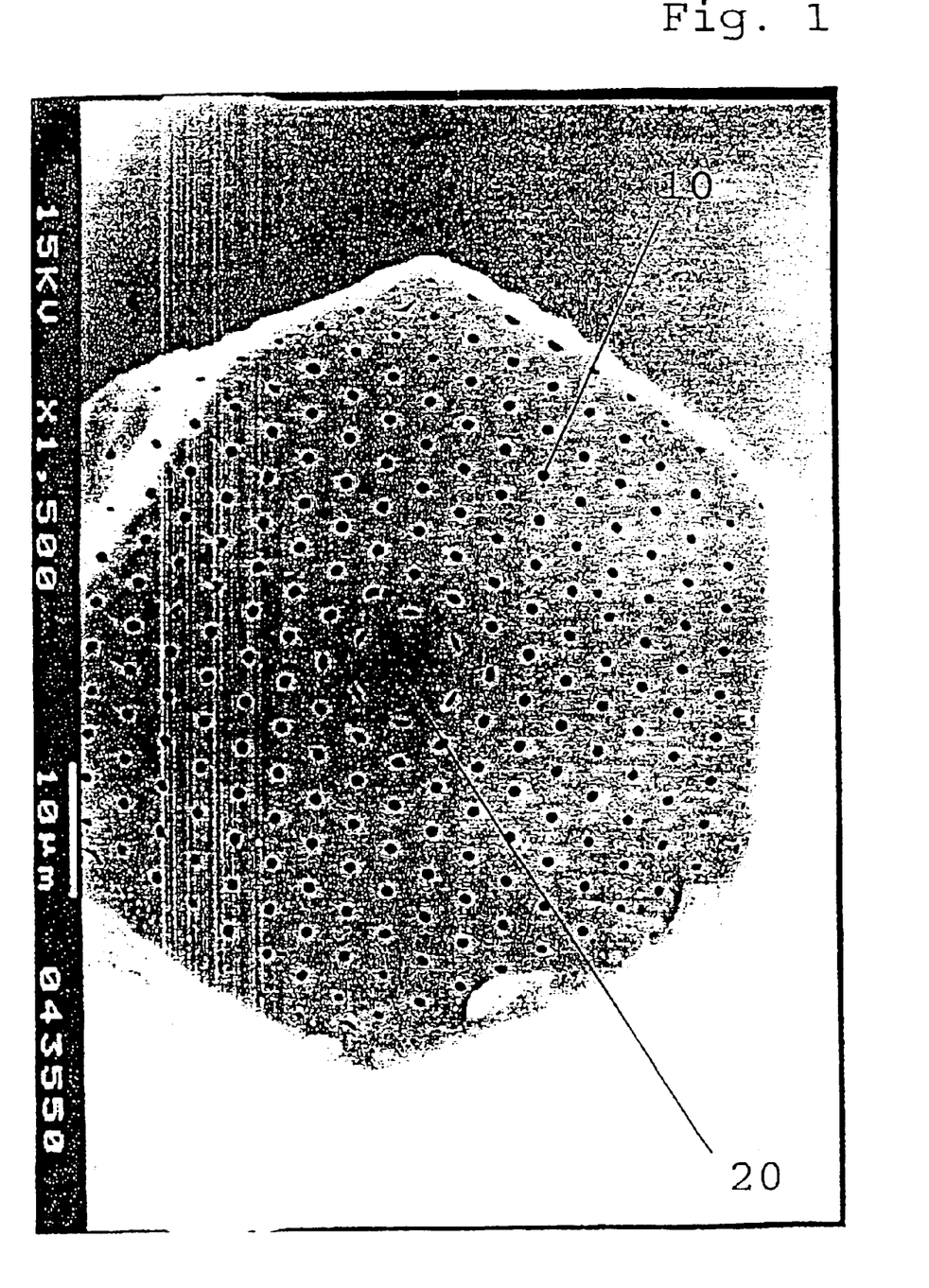
FIG. 1 is a scanning electron microscope image of the end-face of a photonic-crystal fibre according to the invention.

The fibre of FIG. 1 is about 65 $\mu$m across, of hexagonal cross-section and includes a cladding region of undoped silica containing a lattice of holes 10. The holes 10 are arranged at the centres of hexagonal unit cells. (Some of the holes have been distorted by the fabrication process). The diameter of the holes 10 is 0.7 $\mu$m and the pitch 3.5 $\mu$m. The fibre also includes a central unit cell 20 that is a 'defect': it has no hole at its centre and it is made from silica doped with fluorine.

In the manufacture of the fibre, silica capillaries were stacked in a close-packed array to form a fibre preform. At the centre of the array, a solid rod of fluorine-doped silica was used, instead of a silica capillary, to form the core, with an index depression of $1.2 \times 10^{-3}$. The preform was then drawn, using a drawing tower, into a fibre.

Figure 2:
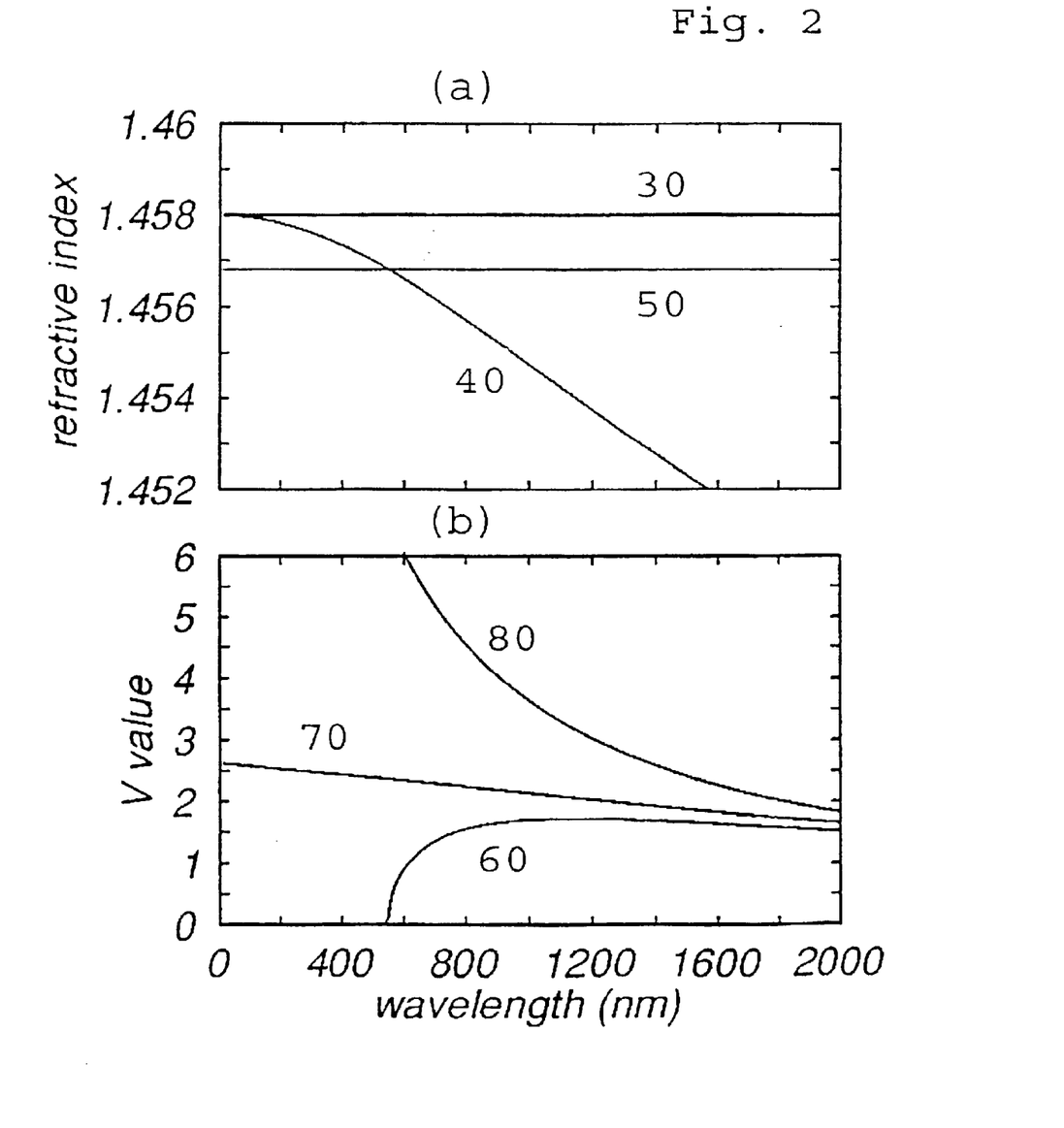
FIG. 2(a) shows various refractive indices as functions of wavelength for the fibre of FIG. 1.
FIG. 2(b) shows V-values as functions of wavelength for the fibre of FIG. 1, a fibre similar to that of FIG. 1 but having a core and a cladding bulk material of the equal refractive index, and a step index fibre.

FIG. 2(a) shows that the refractive index of pure silica (plot 30) is higher than that of fluorine doped silica (plot 50) (note: material dispersion has been neglected in FIG. 2(a) for the sake of clarity). The effective refractive index of the cladding (plot 40) increases with decreasing wavelength and becomes larger than the refractive index of the core at wavelengths below about 500 nm. As wavelength decreases, V therefore decreases and the fundamental mode becomes less confined to the core. The wavelength at which the core and cladding indices are equal is a cut-off wavelength (a lower bound) at which V is zero; the fibre is an 'anti-guide' at wavelengths shorter than that.

FIG. 2(b) shows that variation in V; plot 60 of V for the fibre of FIG. 1 is zero at a cut-off wavelength of about 550 nm, rises to a maximum at about 1200 nm and then gradually falls again. In contrast, plot 70 of V for a standard "matched-index" photonic crystal fibre is (at least in theory) finite at zero wavelength and falls gradually and monotonically to the edge of the plot at 2 $\mu$m. Plot 80 of V for a step index fibre falls monotonically from a very large number to a value of just under 2 at 2 $\mu$m.

Figure 3:
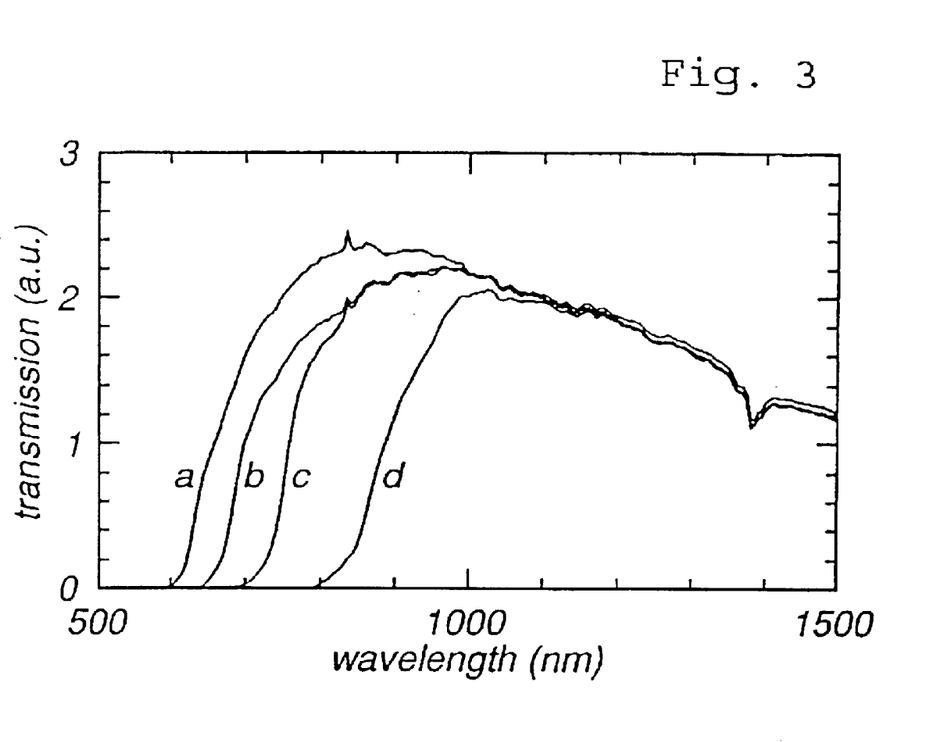
FIG. 3 shows the spectral transmission of 1.5 m of the fibre of FIG. 1 when it was (a) straight, (b) bent to diameter 59.2 mm (c) bent to diameter 29.2 mm and (d) bent to diameter 14.2 mm.

The fibre was subjected to one-turn bends of various diameters and transmission spectra were measured using white light and an optical spectrum analyser (FIG. 3). The short-wavelength bend edge shifts to shorter wavelengths with increasing bend diameter and approaches a finite cut-off wavelength between 600 nm and 700 nm in the limit of zero curvature (curve (a); the impossibility of keeping the fibres truly straight gives a practical cut-off wavelength greater than that predicted in FIG. 2). In contrast, a standard 'matched-index' photonic-crystal fibre has a short-wavelength bend edge but is, at least in theory, a waveguide in the limit of zero wavelength.

Figure 4:
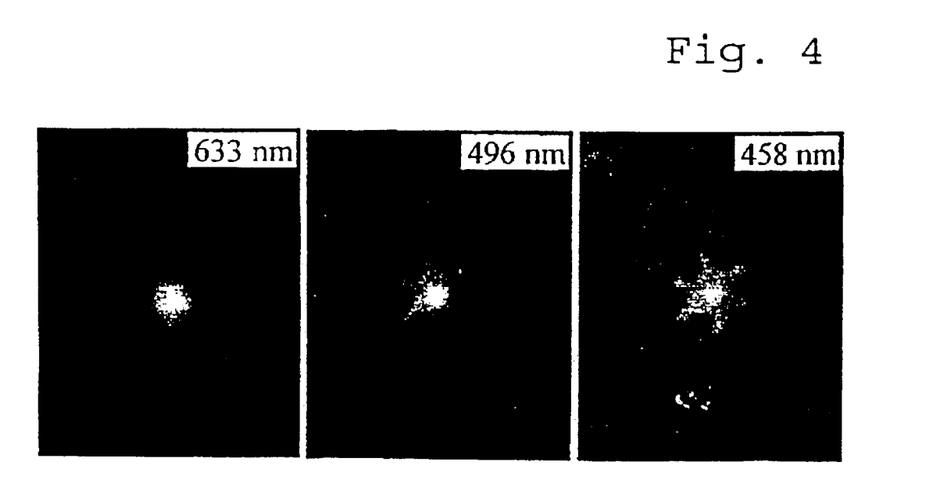
FIG. 4 shows near-field patterns at 633 nm, 496 nm and 458 nm at the end-face of another fibre according to the invention.

Laser light of various wavelengths was launched into 30 mm of another fibre and the near-field patterns at the output end were imaged (FIG. 4). The fibre was chosen so that cut-off occurred within the range of available wavelengths. The fundamental mode pattern was well-confined to the core at 633 nm and became progressively less confined at shorter wavelengths until, at 458 nm, it was not confined at all (note that some mode structure appears to exist, as signified by variations in light intensity in the 458 nm image of FIG. 4). Such behaviour is distinct from that of a standard photonic-crystal fibre, in which the mode field remains confined and becomes invariant in the short wavelength limit.

What is claimed is:

1. A photonic-crystal fibre comprising:
   (i) a core having a first refractive index; and
   (ii) a cladding region at least substantially surrounding the core mud comprising a bulk material having a second refractive index that is higher than the first refractive index, the bulk material containing an arrangement of elongate, longitudinal holes that comprise hole material of a third refractive index that is lower than the first refractive index;

such that an electromagnetic mode guided in the core has an evanescent wave that becomes more closely confined to the vicinity of the core as the wavelength of the electromagnetic mode is increased over a first range of wavelengths.

2. A fibre as claimed in claim 1, in which the difference between the first refractive index and the second refractive index is greater than or equal to $1.2 \times 10^{-3}$.

3. A fibre as claimed in claim 1, having a cut-off wavelength below which the electromagnetic mode is not guided.

4. A fibre as claimed in claim 1, such that the evanescent wave becomes less closely confined to the vicinity of the core as the wavelength of the electromagnetic mode is increased over a second range of wavelengths that are higher than the wavelengths in the first range.

5. A fibre as claimed in claim 1, in which the confinement of the evanescent wave to the vicinity of the core is substantially insensitive to wavelength over a third range of wavelengths.

6. A fibre as claimed in claim 1 in which the core includes a hole that has a larger cross-section than corresponding holes in the cladding region.

7. A fibre as claimed in claim 1, in which the evanescent wave interacts with another entity over at least some wavelengths.

8. A fibre as claimed in claim 7, in which the interaction is greater over a range of shorter wavelengths than over a range of longer wavelengths.

9. A fibre as claimed in claim 7, in which the interaction is significant over a range of shorter wavelengths but is insignificant over a range of longer wavelengths.

10. A fiber as claimed in claim 7, in which post-processing of the fibre has facilitated the interaction.

11. A fibre as claimed in claim 10, in which the post-processing included the abrasive removal of material from the fibre.

12. A fibre as claimed in claim 11, in which the abrasive removal was polishing.

13. A fibre as claimed in claim 10, in which the post-processing included the chemical removal of material from the fibre.

14. A fibre as claimed in claim 13, in which the chemical removal was etching.

15. A fibre as claimed in claim 10, in which the post-processing included local partial or complete collapse of the holes in the cladding region by heating.

16. A fibre as claimed in claim 7, in which the interaction is facilitated by the core being sufficiently close to the periphery of the fibre for a significant part of the evanescent wave to reach the surface of the fibre.

17. A fibre as claimed in claim 16, in which the fibre has a substantially D-shaped cross-section and the core is close to the linear edge of that cross-section.

18. An optical device comprising a photonic-crystal fibre according to claim 7.

19. An optical device as claimed in claim 18, in which the interacting entity is the environment external to the fibre.

20. An optical device as claimed in claim 18, in which the interacting entity is an external measurand.

21. An optical device as claimed in claim 18, in which the interacting entity is an optical element external to the fibre.

22. An optical device as claimed in claim 21, in which the optical element is an optical fibre.

23. An optical device as claimed in claim 22, in which the optical fibre lies adjacent to and parallel to the first fibre.

24. An optical device as claimed in claim 22, in which the optical fibre is photonic-crystal fibre according to any preceding claim.

25. An optical device as claimed in claim 22, in which the optical fibre is a standard fibre.

26. An optical device as claimed in claim 22, in which the fibres have been at least partially fused together.

27. An optical device as claimed in claim 21, which is a directional coupler.

28. An optical device as claimed in claim 27, which is a substantially wavelength insensitive directional coupler.

29. An optical device as claimed in claim 21, in which the optical element is a metallic layer.

30. An optical device as claimed in claim 29, which is an optical fibre polariser.

31. An optical device as claimed in claim 29, which is an optical modulator.

32. An optical device as claimed in claim 21, in which the optical element is a dielectric overlay.

33. An optical device as claimed in claim 32, which is a spectral filter.

34. An optical device as claimed in claim 32, which is an optical switch.

35. An optical device as claimed in claim 18, in which the interacting entity is a structure within the fibre.

36. An optical device as claimed in claim 35, in which the structure is a second core in the fibre.

37. An optical device as claimed in claim 35, in which the structure is a grating.

38. An optical device as claimed in claim 35, in which the structure is a doped material.

39. An optical device as claimed in claim 35, which is a directional coupler.

40. An optical device as claimed in claim 39, which is a substantially wavelength-insensitive directional coupler.

41. An optical device as claimed in claim 35, which is a spectral filter.

42. An optical device as claimed in claim 35, which is an optical sensor.

43. An optical device as claimed in claim 35, which is a laser.

44. An optical device as claimed in claim 35, which is an optical amplifier.

45. A spectral filter comprising a fibre according to claim 1, in which propagation of light at shorter wavelengths is suppressed while propagation of light at a longer wavelength is supported.

46. An optical device, comprising a fibre according to claim 1.

47. A fibre according to claim 1, in which the sensitivity of the fibre to bending is substantially independent of wavelength over a range of wavelengths.

48. A fibre according to claim 1, in which the sensitivity of the fibre to bending is significantly less at longer wavelengths than at shorter wavelengths.

49. A bend sensor comprising a fibre according to claim 1.

50. A laser comprising a fibre according to claim 49, wherein the two wavelengths are a pump wavelength and a laser wavelength.

51. An amplifier comprising a fibre according to claim 49, wherein the two wavelengths are a pump wavelength and an amplified wavelength.

52. A fibre according to claim 1, in which the guided mode's field distributions are substantially similar at two well-separated wavelengths.

53. A method of manufacturing a photonic-crystal fibre, the method comprising:
 (a) forming a stack of canes, the stack including
  (i) canes arranged to form a core having a first refractive index and
  (ii) canes, at least some of which are capillaries, arranged to form a cladding region, at least substantially surrounding the core, and comprising a bulk material having a second refractive index that is higher than the first refractive index, the capillaries having elongate, longitudinal holes that comprise hole material of a third refractive index that is lower than the first refractive index;
 (b) drawing the stack of canes into a fibre;
such that an electromagnetic mode guided in the core of the fibre has an evanescent wave that becomes more closely confined to the vicinity of the core as the wavelength of the electromagnetic mode is increased over a first range of wavelengths.

54. A method as claimed in claim 53, in which the canes arranged to form the core include at least some canes which are capillaries.

55. A method as claimed in claim 53, in which the hole material is air.

56. A method as claimed in claim 53, in which the photonic-crystal fibre comprises a core having a first refractive index and a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index, such that an electromagnetic mode guided in the core has an evanescent wave that becomes more closely confined to the vicinity of the core as the wavelength of the electromagnetic mode is increased over a first range of wavelengths.

57. A method of guiding an electromagnetic mode in a photonic crystal fibre comprising:
 (i) a core having a first refractive index; and
 (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
the method including increasing the wavelength of the electromagnetic mode from a first wavelength to a second wavelength so that an evanescent wave of the mode becomes more closely confined to the vicinity of the core.

58. A method as claimed in claim 57, in which the mode passes from a state in which it is not guided by the core to a state in which it is guided by the core, as the wavelength is increased.

59. Use of a photonic crystal fibre comprising:
   (i) a core having a first refractive index; and
   (ii) a cladding region at least substantially surrounding th core and comprising a bulk material having a second refractive index that is higher than the first refractive index, the bulk material containing an arrangement of elongate, longitudinal holes that comprise hole material of a third refractive index that is lower than the first refractive index;

to enable the evanescent wave of an electromagnetic mode guided in the core to become less closely confined to the vicinity of the core as the wavelength of the electromagnetic mode is decreased from a first wavelength to a second wavelength.

60. Use as claimed in claim 59, in which the mode passes from a state in which it is not guided by the core to a state in which it is guided by the core, as the wavelength is decreased.

61. A method of less closely confining the evanescent wave of an electromagnetic mode guided in a photonic crystal fibre comprising
   (i) a core having a first refractive index; and
   (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;

wherein the evanescent wave is less closely confined to the vicinity of the core by decreasing the wavelength of the electromagnetic mode from a first wavelength to a second wavelength.

62. An optical-fibre device comprising:
   (i) a core having a first refractive index; and
   (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
   (iii) light, having a maximum intensity within the core, but not guided in the core;

wherein, the light would become guided in the core if the wavelength of the light were to be increased beyond a wavelength $\lambda_c$ at which the effective refractive index of the cladding equals the refractive index of the core.

63. A device as claimed in claim 61, in which the device is a spectral filter.

64. A device as claimed in claim 61, in which the device is a sensor.

65. A device as claimed in claim 61, in which the device is a coupler.

66. An evanescent-wave device, comprising:
   (i) a core having a first refractive index; and
   (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;

such that an electromagnetic mode guided in the core has an evanescent wave that becomes more closely confined to the vicinity of the core as the wavelength of the electromagnetic mode is increased over a first range of wavelengths.

67. A photonic-crystal fibre comprising:
   (i) a core having a first refractive index; and
   (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index, such that the cladding region has an effective refractive index between the third refractive index and the second refractive index, the effective refractive index being lower than the first refractive index at a first wavelength, wherein an electromagnetic mode guided in the core has an evanescent wave that becomes more closely confined to the vicinity of the core as the wavelength of the electromagnetic mode is increased to a second, higher, wavelength.

68. A photonic-crystal fibre comprising:
   (i) a core having a first refractive index; and
   (ii) a cladding region for confining light to the core by total internal reflection, the cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;

such that an electromagnetic mode guided in the core has an evanescent wave that becomes more closely confined to the vicinity of the core as the wavelength of the electromagnetic mode is increased over a first range of wavelengths.

* * * * *

UNITED STATES PATENT AND TRADEMARK OFFICE
CERTIFICATE OF CORRECTION

| | |
|---|---|
| PATENT NO. | : 6,853,786 B2 |
| DATED | : February 8, 2005 |
| INVENTOR(S) | : Russell et al. |

It is certified that error appears in the above-identified patent and that said Letters Patent is hereby corrected as shown below:

Title page,
Item [75], Inventors, replace "Phillip" with -- Philip --.
Item [73], Assignee, replace "A/C" with -- A/S --.
Item [56], References Cited, FOREIGN PATENT DOCUMENTS, replace "GB235090" with -- GB2350904 --.
Item [57], ABSTRACT,
Line 4, replace "is higher that" with -- is higher than --.

Column 8,
Line 15, remove "mud".

Column 12,
Line 50, insert claims 69 to 75:
69. A photonic-crystal fibre comprising:
    (i) a core of a solid transparent material having a first refractive index; and
    (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
such that an electromagnetic mode guided in the core has an evanescent wave that becomes more closely confined to the vicinity of the core as the wavelength of the electromagnetic mode is increased over a first range of wavelengths.

70. A method of guiding an electromagnetic mode in a photonic crystal fibre comprising:
    (i) a core of a solid transparent material having a first refractive index; and
    (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
the method including the step of increasing the wavelength of the electromagnetic mode from a first wavelength to a second wavelength so that an evanescent wave of the mode becomes more closely confined to the vicinity of the core.

71. A method of less closely confining the evanescent wave of an electromagnetic mode guided in a photonic crystal fibre comprising
    (i) a core of a solid transparent material having a first refractive index; and
    (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;

UNITED STATES PATENT AND TRADEMARK OFFICE
CERTIFICATE OF CORRECTION

PATENT NO. : 6,853,786 B2
DATED : February 8, 2005
INVENTOR(S) : Russell et al.

It is certified that error appears in the above-identified patent and that said Letters Patent is hereby corrected as shown below:

Column 12 (cont'd),
wherein the evanescent wave is less closely confined to the vicinity of the core by decreasing the wavelength of the electromagnetic mode from a first wavelength to a second wavelength.

72. An optical-fibre device comprising:
 (i) a core of a solid transparent material having a first refractive index; and
 (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
 (iii) light, having a maximum intensity within the core, but not guided in the core; wherein, the light would become guided in the core if the wavelength of the light were to be increased beyond a wavelength °c at which the effective refractive index of the cladding equals the refractive index of the core.

73. An evanescent-wave device, comprising:
 (i) a core of a solid transparent material having a first refractive index; and
 (ii) a cladding region at least substantially surrounding the core and comprising a bulk material having a second refractive index that is higher than the first refractive index, the bulk material containing an arrangement of elongate, longitudinal holes that comprise hole material of a third refractive index an arrangement of elongate, longitudinal holes that comprise hole material of a third refractive index that is lower than the first refractive index;
such that an electromagnetic mode guided in the core has an evanescent wave that becomes more closely confined to the vicinity of the core as the wavelength of the electromagnetic mode is increased over a first range of wavelengths.

74. A photonic-crystal fibre comprising:
 (i) a core of a solid transparent material having a first refractive index; and
 (ii) a cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index, such that the cladding region has an effective refractive index between the third refractive index and the second refractive index, the effective refractive index being lower than the first refractive index at a first wavelength,
wherein an electromagnetic mode guided in the core has an evanescent wave that becomes more closely confined to the vicinity of the core as the wavelength of the electromagnetic mode is increased to a second, higher, wavelength.

UNITED STATES PATENT AND TRADEMARK OFFICE
CERTIFICATE OF CORRECTION

PATENT NO. : 6,853,786 B2
DATED : February 8, 2005
INVENTOR(S) : Russell et al.

It is certified that error appears in the above-identified patent and that said Letters Patent is hereby corrected as shown below:

<u>Column 12 (cont'd),</u>
75. A photonic-crystal fibre comprising:
    (i) a core of a solid transparent material having a first refractive index; and
    (ii) a cladding region for confining light to the core by total internal reflection, the cladding region at least substantially surrounding the core and comprising a bulk material having a second refractive index that is higher than the first refractive index, the bulk material containing an arrangement of elongate, longitudinal holes that comprise hole material of a third refractive index that is lower than the first refractive index;
such that an electromagnetic mode guided in the core has an evanescent wave that becomes more closely confined to the vicinity of the core as the wavelength of the electromagnetic mode is increased over a first range of wavelengths.

Signed and Sealed this

Twenty-fifth Day of April, 2006

JON W. DUDAS
*Director of the United States Patent and Trademark Office*